(No Model.)
J. H. SORDEN.
GREASE CUP.
No. 412,556. Patented Oct. 8, 1889.
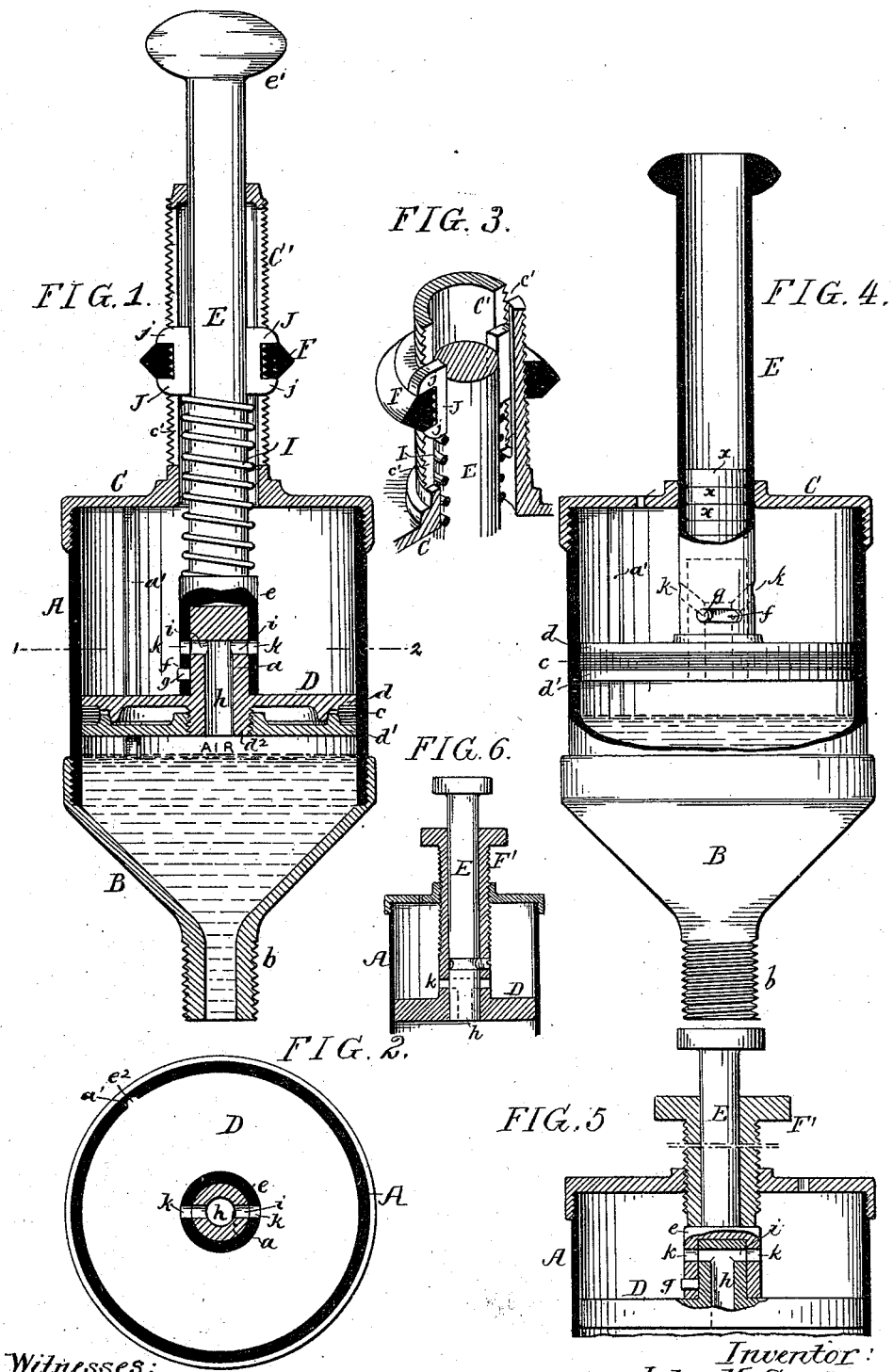
Witnesses:
Hamilton D. Turner.
John J. Leary.
Inventor:
John H. Sorden
by his Attorneys
Howson & Howson

UNITED STATES PATENT OFFICE.

JOHN H. SORDEN, OF PHILADELPHIA, PENNSYLVANIA.

GREASE-CUP.

SPECIFICATION forming part of Letters Patent No. 412,556, dated October 8, 1889.

Application filed June 7, 1889. Serial No. 313,421. (No model.)

*To all whom it may concern:*

Be it known that I, JOHN H. SORDEN, a citizen of the United States, and a resident of Philadelphia, Pennsylvania, have invented certain Improvements in Grease-Cups for Lubricating Purposes, of which the following is a specification.

The object of my invention is to construct a grease-cup in which a body of air is maintained between the surface of the grease and the bottom of the compression-disk in order to allow for the free agitation of the grease due to the vibration of the machine to which the cup is applied.

In the accompanying drawings, Figure 1 is a vertical section of my improved grease-cup. Fig. 2 is a sectional plan on the line 1 2, Fig. 1. Fig. 3 is a detached perspective view of a portion of the cup; and Figs. 4, 5, and 6 are modifications.

A is the body of the cup, having a funnel-shaped bottom B, the lower extremity $b$ of which is threaded for application to the machine to be lubricated.

C is a cap, in the present instance screwed to the body A and having an extension C', which is screw-threaded for a purpose described hereinafter.

D is the plunger adapted to fit snugly to the body A of the cup, the plunger being made in the present instance of two disks $d$ $d'$, and between these two disks is inserted a packing-ring $c$. The disk $d'$ is screwed onto a stem $d^2$ on the under side of the disk $d$, and the packing-ring $c$ can thus be forced against the body of the cup.

On the upper portion of the plunger D is a spindle $a$, to which is adapted a sleeve $e$, forming a part of the stem E, having at its upper end a suitable handle $e'$. This sleeve $e$ fits snugly over the spindle $a$, and cut in the sleeve is a slot $f$, as shown more clearly in Fig. 4, into which projects a pin $g$ from the spindle $a$, so that the sleeve $e$ can turn on the spindle a certain distance.

In the center of the plunger D is an orifice $h$, which communicates with one or more transverse openings $i\ i$ in the upper portion of the spindle $a$, and in the sleeve $e$ are openings $k\ k$ on a line with the openings $i\ i$, so that when the sleeve is turned to a certain position the openings $k$ and $i$ come opposite each other and allow the air that is above the piston to gain access to the space below the piston.

Adapted to the threaded extension C' is a nut F, (shown in Figs. 1 and 3,) the extension being slotted at $c'$, and adapted to these slots are two blocks J J, having lips $j$, which overlap the top and bottom of the nut F. The inner edges of these blocks rest against the stem E, and between the lower edges of the blocks J and the stem E is a coiled spring I, and by turning the nut F upon the extension in one direction or the other the spring I will be compressed or expanded, as the case may be. The object of this spring is to place more or less pressure upon the grease, according to its condition, and to allow for any extra vibrating motion caused by the movement of the machine.

The plunger D is prevented from turning when the stem E is turned by a projection or lug $e^2$, which is adapted to slide in a groove $a'$ on the body A.

In Fig. 4 I have shown the stem E hollow its entire length, and in place of the spring I have substituted weights $x$, which are inserted in the hollow stem E, so that when more pressure is required the weights are increased and if less pressure is required the weights are removed. This does away with the spring for the stem, and, although not as sensitive as the construction shown in Fig. 1, can be utilized to advantage where circumstances warrant. The openings $i$ and $k$ may be made at right angles to the central orifice $h$, as shown in Fig. 1, and may be tapered, as shown by dotted lines in Fig. 4, without departing from my invention.

In Fig. 5 I have shown the plunger adjusted by means of a screw-sleeve nut F', adapted to a threaded opening in the cap of the cup. When the cup is filled, the cap is placed in position and the screw sleeve-nut F' raised, the stem E is turned to open communication between the space below the cap, and the stem is then quickly raised and then the valve is turned, after which the screw-sleeve is screwed down to give the required pressure. This sleeve answers the same purpose as the spring, but will not yield.

In Fig. 6 the screw-sleeve F' and plunger D are made in one piece, and the valve-stem E is adapted to turn in the screw-sleeve. The plunger in this case cannot be raised as fast as in the other cups shown, as it must be raised by turning the screw-sleeve; but in this case the guide for the plunger is dispensed with.

By constructing the cup in the manner above described I am enabled to feed grease to the machinery in almost any condition and in a steady stream, as I utilize not only the pressure of the plunger to force the grease from the cup, but also form between the plunger and the grease a body of air, which allows the grease to have a sufficiently free motion, owing to the vibration of the machine to which the cup is attached, and thereby the grease is at all times fed to the machine without clogging. After the grease is placed in the cup the air-openings $i$ and $k$ are brought in line, so as to allow the air to gain access to the space between the grease and the plunger D by raising said plunger by means of the handle $e'$, and when in this position the stem E is turned to close the valve and cut off communication between the air above and below the plunger, so that there will be a body of air between the bottom of the plunger and the grease, as shown in Figs. 1 and 2, and as the air-space between the plunger and the grease decreases the valve can be again opened, the plunger raised, and the valve closed, as above.

I claim as my invention—

1. The combination, in a grease-cup, of the casing, the plunger, with an air-valve and stem, with screw mechanism, substantially as described, whereby the pressure may be regulated independently of the valve-stem, substantially as specified.

2. The combination, in a grease-cup, of the body A and the plunger D, having a spindle in which are valve-openings, with a stem also having valve-openings in line with the valve-openings of the plunger, so that on turning the valve-stem air communication will be established between the space above and the space below the piston, substantially as described.

3. The combination, in a grease-cup, of the body A, the plunger D, having a valve-opening, and a stem also having a valve-opening in line with that of the plunger, with a cap on the casing having a screw-threaded extension, a nut adapted to said screw-threaded extension, and a spring between the nut and plunger, so that a varied pressure can be obtained, substantially as described.

4. The combination, in an oil-cup, of the plunger having a spindle and valve-opening therein, with a stem having a sleeve provided with a valve-opening, said sleeve being slotted, and a pin on the plunger adapted to said slot, so that the turning movement of the stem will be limited to cut off and establish communication between the space above and air-space below the plunger, substantially as described.

5. The combination, in a grease-cup for lubricating purposes, of the casing A, having a cup C, slotted extension C' thereon, screw-threads on said extension, a nut adapted to said screw-threads, and blocks J J, with a plunger D, the stem E, and a spring between the blocks and a shoulder on the plunger, substantially as and for the purpose described.

In testimony whereof I have signed my name to this specification in the presence of two subscribing witnesses.

JOHN H. SORDEN.

Witnesses:
  WILLIAM D. CONNER,
  HENRY HOWSON.